United States Patent
Avery

[11] Patent Number: 5,931,288
[45] Date of Patent: Aug. 3, 1999

[54] CONVEYOR TRACK COVER

[75] Inventor: Mark J. Avery, Farmington Hills, Mich.

[73] Assignee: Jervis B. Webb Company, Farmington Hills, Mich.

[21] Appl. No.: 08/935,185

[22] Filed: Sep. 22, 1997

Related U.S. Application Data

[60] Provisional application No. 60/025,769, Sep. 23, 1996.

[51] Int. Cl.[6] .................................................. B65G 25/00
[52] U.S. Cl. .................................. 198/860.5; 198/860.3; 104/139; 104/140
[58] Field of Search .............................. 198/860.5, 860.3, 198/845, 838; 104/139, 140, 146, 145, 172.3

[56] References Cited

U.S. PATENT DOCUMENTS

| | | | |
|---|---|---|---|
| 3,791,308 | 2/1974 | Hartz | 104/139 |
| 4,089,270 | 5/1978 | Blake | 104/119 |
| 4,347,791 | 9/1982 | Mandros | 104/139 |
| 4,729,470 | 3/1988 | Bacigalupe et al. | 198/838 |
| 4,892,041 | 1/1990 | Fukuda | 104/140 |

FOREIGN PATENT DOCUMENTS

| | | | |
|---|---|---|---|
| 0 597 416 A1 | 5/1994 | European Pat. Off. . | |
| 3636416 C1 | 10/1989 | Germany . | |
| 176263 | 7/1991 | Japan | 104/139 |
| 197711 | 11/1977 | U.S.S.R. | 198/860.5 |
| 787676 | 12/1980 | U.S.S.R. | 198/860.3 |
| 916357 | 3/1982 | U.S.S.R. | 198/860.3 |
| 998247 | 2/1983 | U.S.S.R. . | |
| 1747356-A1 | 7/1992 | U.S.S.R. . | |
| 2191164 | 12/1987 | United Kingdom | 198/860.5 |

Primary Examiner—Kenneth Noland
Assistant Examiner—Khoi H. Tran
Attorney, Agent, or Firm—Dickinson Wright PLLC

[57] ABSTRACT

A cover for a channel, such as the channel which runs along the top of a section of conveyor track, is disclosed for excluding foreign matter from the interior of the track while allowing a pedestal extending from the interior of the track to traverse the channel. The cover is formed from two cover halves extending inwardly over the channel from supports running alongside of the channel, and the cover halves include resilient outer portions and hard yet flexible inner portions. The inner portions contact the passing pedestal and flex out of the way as the pedestal passes between them. The outer portions provide an inward biasing force against the inner portions for holding them against the passing pedestal and returning them to a closed position after a pedestal has passed.

25 Claims, 4 Drawing Sheets

CONVEYOR TRACK COVER

The present application is a continuation of provisional application Ser. No. 60/025,769 filed Sep. 23, 1996.

The present invention is directed to a cover for a conveyor track, and more particularly, toward a cover for a conveyor track that opens immediately in front of a passing carrier support and closes after said carrier support has passed.

BACKGROUND OF THE INVENTION

Conveyor systems are used to move objects from one point to another, either directly or via various intermediate points. Most conveyors include a moving portion, some type of carrier for supporting an object, and a connector for connecting the carrier to the moving portion of the conveyor. Often, the carrier is spaced some distance from the moving portion of the conveyor. This arrangement allows an object on the carrier to be located at a desired elevation for processing purposes while the belts, chains and other portions of the conveyor are kept out of the way, beneath a platform or overhead, for example. This arrangement has been proven effective and is used in many diverse types of conveyor systems today.

Conveyors are often used in industrial or other environments where they are exposed to dust and dirt and airborne contaminants such as paint over-spray, chemical vapors, and water. If an object on a carrier is being exposed to paint and chemicals, the carrier will likewise be exposed. Carriers are generally relatively simple steel platforms or hooks having few moving parts and thus are not easily damaged. If they are damaged, they are relatively easy and inexpensive to replace. The rest of the conveyor system, however, including the chains, belts, switches, trolleys and trolley support tracks, can quickly be damaged when exposed to paint or chemicals or debris. This is a particular problem when the carrier is used to carry a part through a paint shop or a treatment station where chemicals are sprayed onto the part. Conveyors can also be damaged when loose parts, such as nuts or bolts, or hand tools, fall into the conveyor system. These foreign objects can cause the system to jam and/or may damage various parts of the system. Such damage is often difficult, time consuming, and expensive to fix.

One way of providing protection for the non-carrier portions of a conveyor system is to substantially enclose the conveyor track, and leave only a narrow opening above the track through which the connector or pedestal extends. This may slow down the rate at which contaminants come into contact with the conveyor system parts, but it does not eliminate, or even substantially lessen, the severity of the problem. In addition, if the opening above the track is too narrow, it may not be possible to use different pedestals with the system without extensive modifications. This construction can also make it difficult to access the conveyor mechanisms within the enclosure for maintenance and other purposes. Given the marginal improvement offered by this approach, it is often not worth the expense of installing such a system or modifying an existing system in this manner. Another approach to protecting conveyor mechanisms is to provide a two-piece cover that extends the length of the track. These cover pieces extend from either side of the track toward the track centerline and meet directly thereabove. The two cover elements fold up around the lower portion of the pedestal in the vicinity of the pedestal. This fold travels along with the pedestal as the pedestal travels down a track. Unlike the first approach outlined above, this type of seal protects all portions of a track except for those in the immediate vicinity of the pedestal.

It has been found that the two pieces of material must meet rather tightly, or even overlap, in order to form an effective seal. If the cover elements meet too tightly, however, they provide a significant degree of resistance to each passing pedestal. This problem is aggravated by the high coefficients of friction common to materials, such as various rubbers, that must be used for such covers. This drag can affect the performance of the system and may require that a more powerful drive motor be used to overcome this drag. This problem can be addressed by leaving a small space between the cover elements; however, this space allows contaminants to enter the conveyor system and will not entirely eliminate the drag. The cover elements may also bias the pedestal in a direction normal to its intended course if they push against the pedestal with unequal force, such as when they do not meet immediately above the track centerline. All of these difficulties make it undesirable to use conveyor covers of this type except when absolutely necessary, and even then, modifications to the system may be required in order to allow the system to function with these covers in place.

SUMMARY OF THE INVENTION

These and other problems are addressed by the present invention which comprises an improved two-part track cover or seal which helps protect the portion of the conveyor system beneath the cover from contamination. In particular, the cover of the present invention comprises two cover halves that extend inwardly from supports running along either side of a conveyor. At least one of these cover halves has a first or outer portion made from a first material and a second or inner portion made from a second material. The outer portion is connected to one of the supports and is made from a resilient material such as a soft rubber. The inner portion is made from a hard yet flexible material such as polyethylene. In the preferred embodiments, both cover halves have inner and outer portions made from these different materials. The inner portions of the cover halves are held against one another by the outer portions. When a conveyor pedestal passes between the cover halves, however, it pushes the inner portions apart, and the resilient outer portions flex or bend to allow the inner portions to separate in this manner. After the pedestal has passed, the inner portions are biased back into sealing contact with one another by the outer portions. A small opening immediately in front of and behind the pedestal moves along with the pedestal down the track.

Conveyor track covers, including the seal described herein, are most useful in connection with pedestal-type conveyors in which a conveyor trolley or chain or belt is disposed within a housing on or beneath a floor. The pedestal extends upwardly through the cover seal and supports a carrier which carries an object above the cover. The present invention will therefore be described in terms of such conveyors. However, it should be understood that the subject cover could be used in a similar manner in connection with an overhead conveyor or any other conveyor wherein a carrier is spaced apart from a chain or trolley by a connector. Therefore, while the term pedestal may be read to imply something that supports from below, the present invention is in no way limited to uses wherein the connector extends from below or is a source of support for the carrier.

In a first preferred embodiment, the cover halves are mounted on a pair of horizontal supports running generally above and parallel to the conveyor track. These supports may be attached to the track or track supports, or may be part of another structure, such as a floor in cases where the conveyor is disposed beneath a floor with a pedestal extending through an opening in the floor. These supports each hold a thin support strip which extends inwardly from the supports toward the centerline of the track. These support strips define a slot in which the pedestal travels and are held in place relative to the support by a clamp. The clamp also holds a layer of resilient material, such as rubber, against the plate members, which layer of rubber extends inwardly nearly as far as the innermost edge of the support strip. The rubber sheet is only connected to the support member at the clamp; the portion of the sheet inward of the clamp merely lays on the support strip. This resilient sheet forms the outer portion of one of the cover halves discussed above. The inner portion of the cover half is a length of flexible material such as polyethylene attached to the underside of the rubber sheet and supported by the support strip. This inner portion extends inwardly to a point above the centerline of the track where it sealingly engages the inner portion of the other cover half. When a trolley travels along the track with its pedestal extending vertically, the pedestal pushes the inner portions of the cover halves away from the centerline. The outer portions of the cover halves flex to allow the inner portions to move outwardly and then push the inner portions back into engagement after the pedestal has passed. The flexible nature of the inner portions allow them to remain in contact except in the immediate vicinity of the pedestal. The hardness of the inner portions puts only a small drag on the passing pedestal and makes them resistant to wear.

In a second embodiment, the subject invention comprises cover halves supported as in the first embodiment, but the cover halves themselves are different. The outer portion of the cover halves in this embodiment still comprise a generally flat portion that overlays the plate member. This outer portion terminates in a T-shaped portion that extends over the slot toward the oppositely facing T-shaped portion of the other cover half. The inner portions of the cover halves are strips of a hard, flexible material attached to the inner faces of the T-shaped portions and held in sealing engagement against each other by the resilient outer members. In this embodiment, a passing pedestal travels between these two inner portions and causes the outer portions of the cover halves to flex to allow the inner portions to separate. After the pedestal passes, the outer portions resume their original configuration and push the inner portions back into a sealing engagement.

Accordingly, it is a principal object of the present invention to provide a cover for protecting a portion of a conveyor system.

It is another object of the present invention to provide a cover for covering an opening while allowing an object to travel along the opening.

It is still another object of the present invention to provide a cover for use in connection with a conveyor system that includes a pedestal traveling between two spaced apart walls for covering the opening between the two spaced apart walls.

It is a further object of the present invention to provide a cover for covering a portion of a conveyor that has a first portion made from a first material and a second portion made from a second material.

It is yet another object of the present invention to provide a cover for covering a portion of a conveyor that includes a first portion made from a resilient material and a second portion made from a flexible material.

It is yet a further object of the present invention to provide a two-part cover for covering a portion of a conveyor system which contacts, but does not significantly interfere with a moving portion of the conveyor system.

It is still a further object of the present invention to provide a cover for covering an opening having a length which cover includes two elements in sealing engagement with each other, wherein the elements can be separated by an object traveling along the opening and then return to a condition of sealing engagement after the object has passed.

BRIEF DESCRIPTION OF THE DRAWINGS

These and other objects of the invention will become apparent from a reading and understanding of the following detailed description of several preferred embodiments of the invention together with the following drawings of which.

DETAILED DESCRIPTION OF THE PREFERRED EMBODIMENTS

Figure 1:
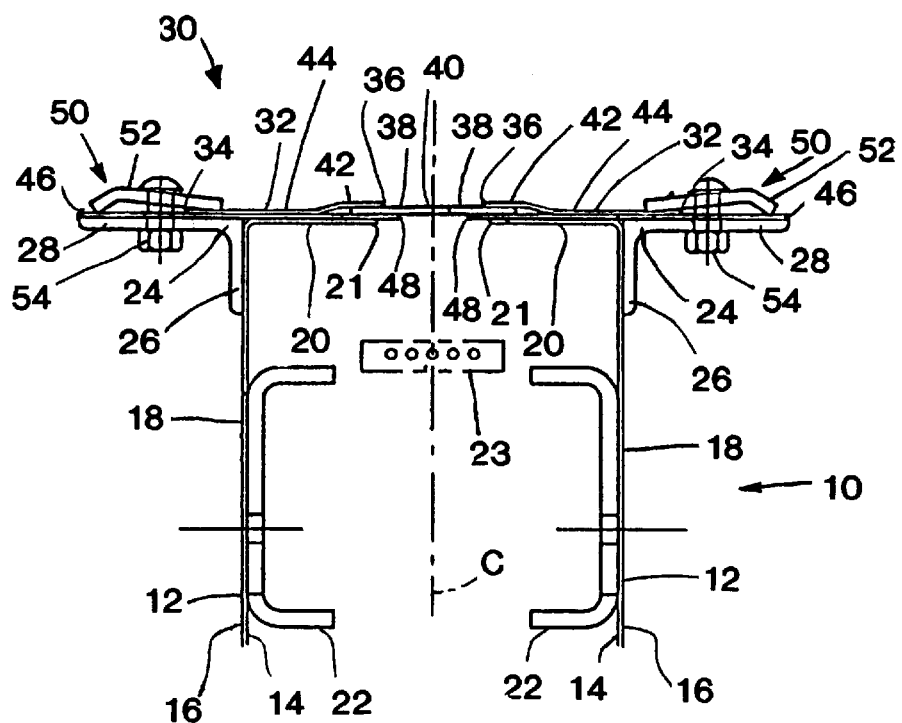
FIG. 1 is front elevation view of a first embodiment of the present invention showing a cover for a conveyor track.
Figure 2:
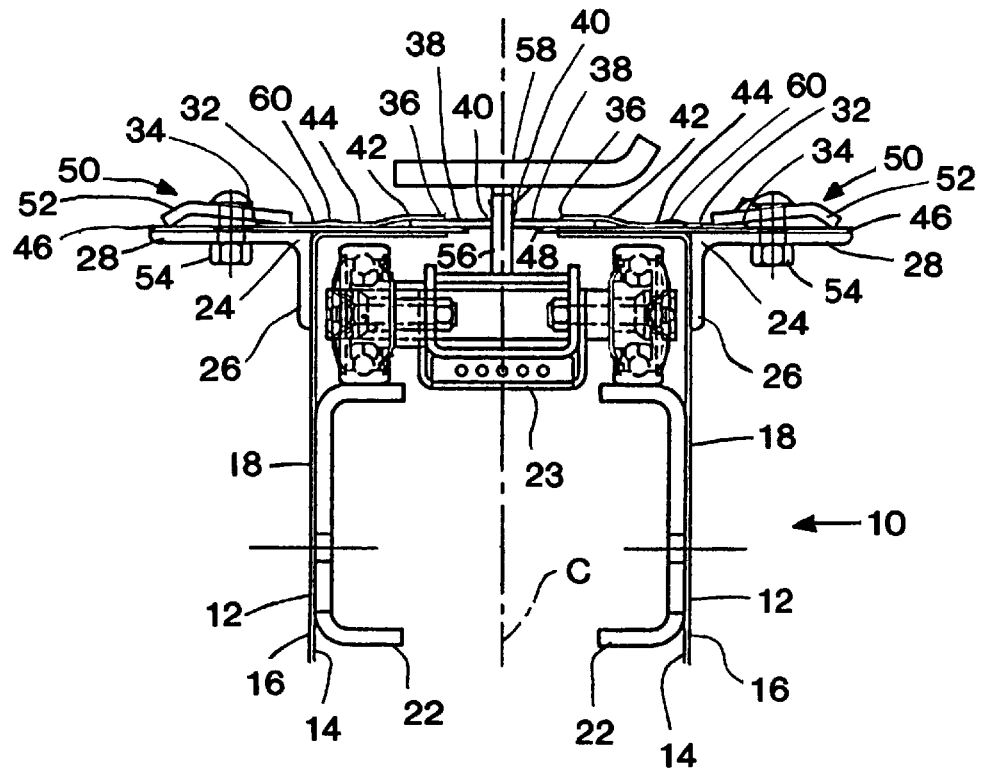
FIG. 2 is a front elevation view of the cover and conveyor track of FIG. 1 showing a trolley having a pedestal portion extending between two portions of the cover.
Figure 3:
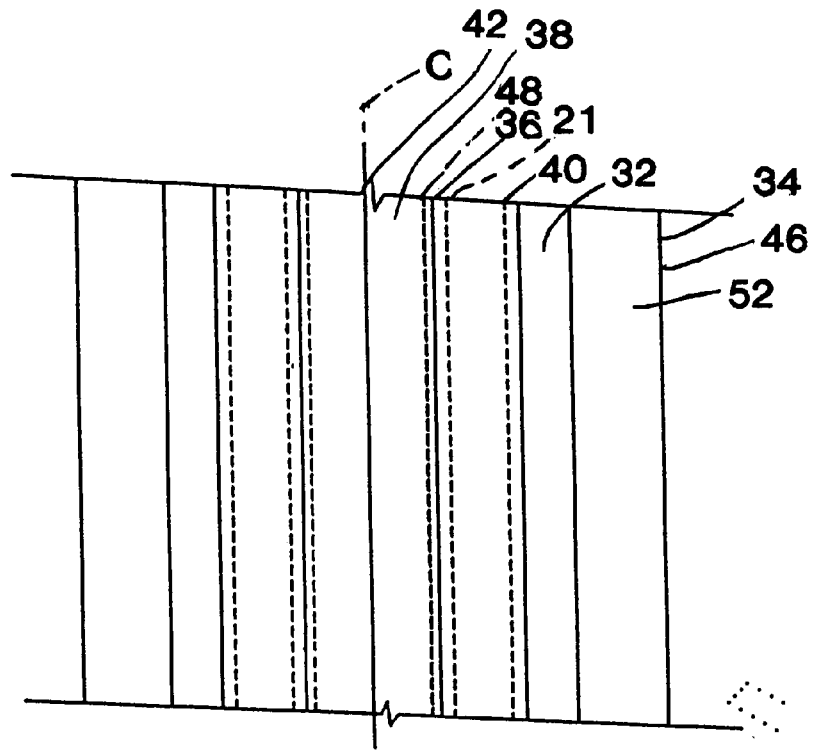
FIG. 3 is a top plan view of the cover shown in FIG. 1.
Figure 6:
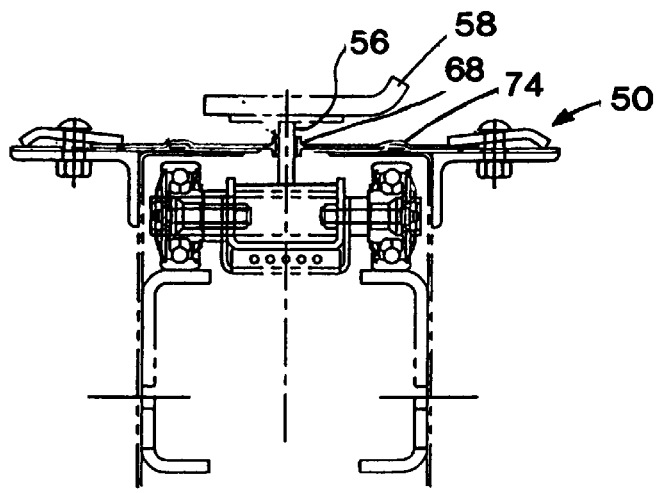
FIG. 6 is a front elevation view of the cover and conveyor track of FIG. 5 showing a trolley having a pedestal portion extending between two portions of the cover.
Figure 7:
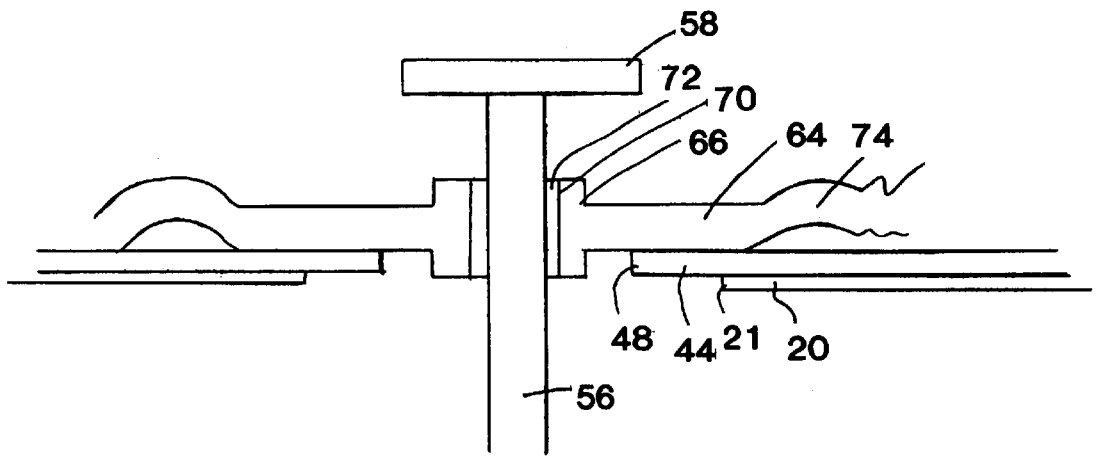
FIG. 7 is an enlarged elevational view of a portion of the cover shown in FIG. 6.
Figure 8:
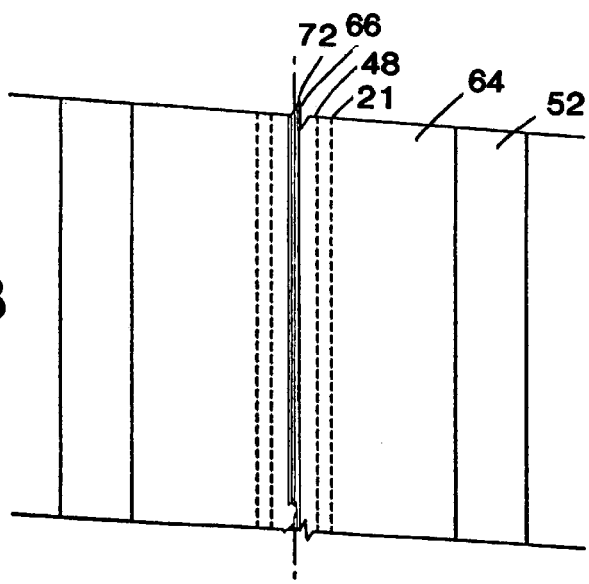
FIG. 8 is a top plan view of the cover shown in FIG. 5.
Figure 9:
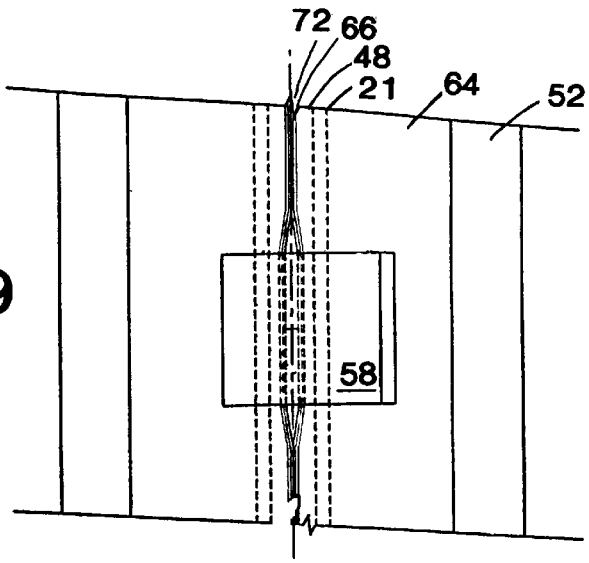
FIG. 9 is a top plan view of the cover and conveyor shown in FIG. 6.
Figure 10:
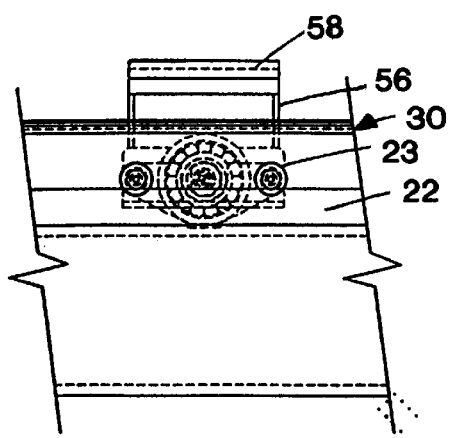
FIG. 10 is a side elevation view of the cover, track and trolley shown in FIG. 5.

Referring now to the drawings, wherein the showings are for purposes of illustrating several preferred embodiments of the present invention only, and not for purposes of limiting same, FIG. 1 shows a conveyor track assembly designated generally by the numeral 10 comprising a pair of side supports 12 having inner sides 14 and outer sides 16. Supports 12 include vertical side walls 18 and horizontal top walls 20 having interior edges 21 extending inwardly of side walls 18. The track, and the cover therefor which will be described hereinafter, are symmetric about centerline C which runs the length of the track. The inside of the track is the region between side walls 18. Top walls 20 extend toward centerline C and toward one another but do not meet. Track 10 also includes pair of rails 22 supported by side walls 18 and spaced apart from top walls 20 a sufficient distance to allow a trolley 23, such as shown in FIGS. 3 and 6, to travel along track 10 without contacting the underside of top walls 20. A pair of support brackets 24, having vertical leg portions 26 and horizontal portions 28 are connected to the outer sides 16 of vertical walls 18 with vertical leg portions 26 welded to vertical side walls 18 and positioned such that horizontal portions 28 of the brackets form a continuation of walls 20 extending away from centerline C. Brackets 24 extend the length of track 10 and are used to support a cover as will be described hereinafter.

The track includes a cover designated generally by the numeral 30 which comprises a pair of outer cover strips 32 having an exterior edge 34 and an interior edge 36, a pair of inner cover strips 38 having an exterior edge 40 and an interior edge 42, and a pair of support strips 44 having an exterior edge 46 and an interior edge 48. Cover 30 is symmetrical about centerline C and extends inwardly from each of the support brackets 24 along the entire length of the conveyor or a portion thereof. Each element of the pairs of cover strips 32, 38, 44 is associated with one of the support brackets 24 and is normally positioned so that it is generally parallel to top walls 20 of side supports 12.

Support strips 44 overlay horizontal portions 28 of support brackets 24 and horizontal walls 20 of side supports 12, and extend over interior edges 21 of walls 20 toward each other and toward centerline C. These support strips 44 are used to support the other elements of cover 30 as will be described in greater detail hereinafter. Strips 44 are also used to vary the width of the opening or slot between interior edges 21 of walls 20. This slot must be wide enough to accommodate a variety of different pedestals or other devices that will extend therethrough. However, the slot may be too wide for many applications and would allow dirt and other foreign material into the interior of the track if not covered. It can also be difficult to cover a slot that is too much wider than the width or diameter of objects that will be traversing the slot. Therefore, strips 44 are positioned on horizontal walls 20 to narrow the slot sufficiently to allow a pedestal or other object to traverse the slot while also providing an inch or two of clearance on either side of the pedestal. Strips 44 are clamped to support brackets 24 by clamps 50 comprising a holding bar 52 and nuts and bolts 54. Holding bar 52 overlies one of the strips 44, and the nuts and bolts 54 are tightened to hold bar 52 firmly against wall 20, thereby sandwiching strip 44 therebetween. The nuts and bolts can be loosened to allow the strips to be repositioned for different applications.

Outer cover strips 32 overlay support strips 44 and the exterior edges 34 of cover strips 32 are held against support strips 44 by clamps 50. The portion of outer strips 32 between clamp 50 and interior edge 36 is supported by the support strips but is not attached thereto and can be lifted or folded to separate a portion of cover strip 32 from the support strips. Outer strips 32 are preferably constructed from a soft, resilient material such as a soft rubber. The interior edges 36 of the outer strips 32 are located generally above the interior edges 21 of horizontal walls 20.

Inner cover strips 38 are located between outer strips 32 and support strips 44 and positioned so that the interior edges 42 of strips 38 meet at centerline C. Inner strips 38 are connected to outer strips 32 in any suitable manner, such as by gluing, but are not connected to the support strips and are free to slide thereon towards and away from centerline C. When cover 30 is closed, outer strips 32 lie flat against support strips 44 and hold the inner strips 38 firmly against each other to form a seal for keeping foreign material away from rails 22. Inner strips 38 are preferably made from a hard plastic material having a low coefficient of friction and good wear resistance. High density polyethylene is one such suitable material.

Figure 4:
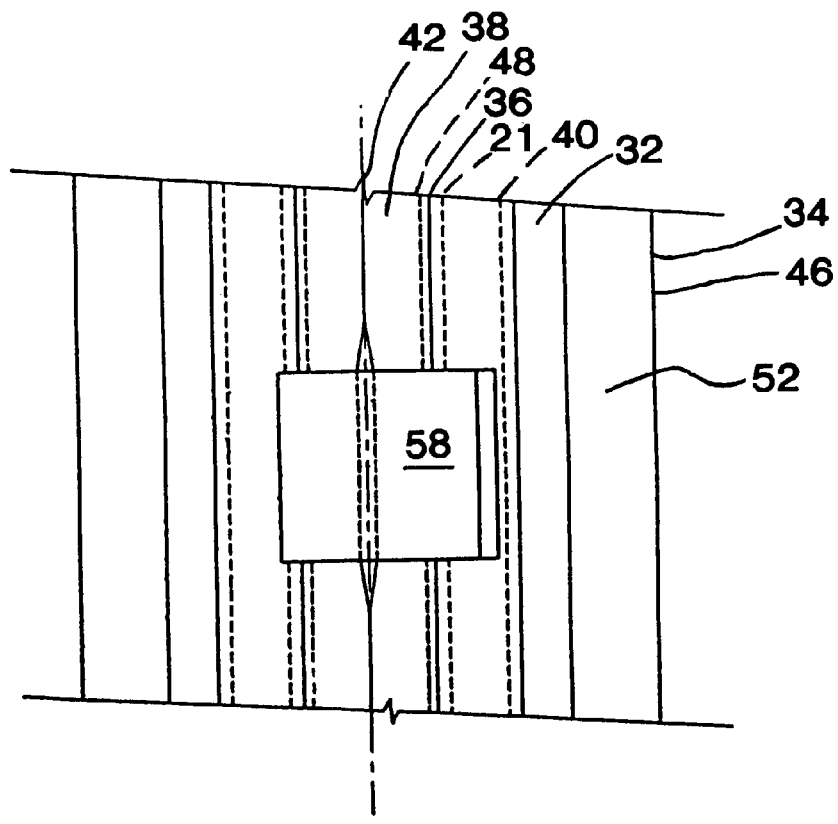
FIG. 4 is a top plan view of the cover and conveyor shown in FIG. 2.
Figure 5:
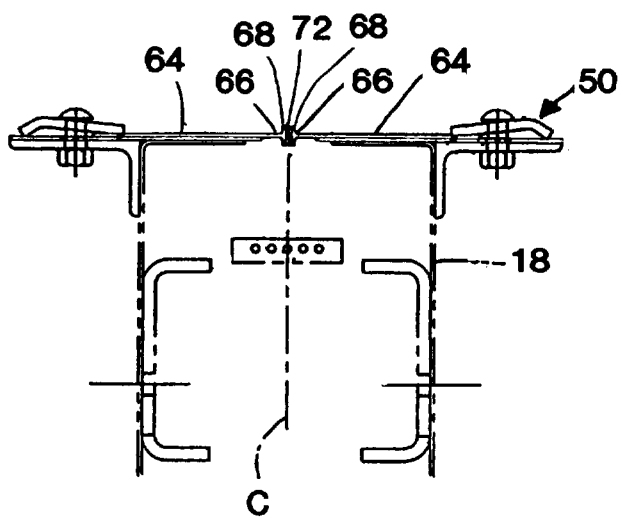
FIG. 5 is a front elevation view of a second embodiment of the present invention.

In use, cover 30 remains closed with strips 38 in sealing engagement with one another until a trolley 23 is placed onto the track. The trolley includes a pedestal 56 and a carrier 58 supported on the trolley by pedestal 56. Pedestal 56 is positioned between the interior edges 42 of inner strips 38 holding these inner edges away from each other in the vicinity of the pedestal. This introduces a ripple 60 into outer strips 32 between pedestal 56 and clamp 50. However, because inner strips 38 are flexible, the biasing force of outer strips 32 holds the inner strips against one another both upstream and downstream from the location of the pedestal. Thus the cover protects rails 22 along the length of the track, except in the immediate vicinity of a pedestal. As trolley 23 moves along track 10, the pedestal separates inner strips 38 in front of it while the outer strips supply sufficient force to push the inner strips against one another in the region where the trolley has just been. Inner strips 38 slide over support strips 44 away from centerline C as the pedestal approaches a given section of the inner strips and back toward each other and centerline C after the pedestal passes. In this manner, a small opening travels along with a trolley, while the cover generally remains in a closed position. As can be seen from FIG. 4, carrier 58 is positioned above the opening between the inner strips and travels along with the opening as trolley moves. This provides additional protection for the interior of track 10 since the carrier covers a substantial portion of the opening. The inner strips are wear resistant and have a low coefficient of friction and do not substantially interfere with the passage of the pedestal.

FIGS. 5–10 show a second embodiment of the present invention, and the reference numerals from the first embodiment are used to identify elements common to both embodiments. In this embodiment, the cover comprises two resilient sheets of material 64 each having an exterior end held against horizontal walls 20 by clamps 50, and an interior end 66 extending toward centerline C. The interior ends terminate in end walls 68 normal to support strips 44 and together end walls 68 and sheets 64 have a T-shaped cross section. The end walls 68 have interior surfaces 70 which face each other across centerline C. The resilient sheets of material are made from the same types of material described in connection with the first embodiment. Thin strips 72 of a hard and flexible material, such as the material used to form the inner strips of the first embodiment, are attached to the interior surfaces 70 of end walls 68. Strips 72 are held against one another by the resilient sheets 64 to form a seal therebetween for protecting the interior of track 10. When a trolley traverses track 10, its pedestal 56 separates end walls 68 and introduces a ripple 74 into resilient sheets 64. As in the first embodiment, the opening around the pedestal travels with the pedestal and is closed by the force of the resilient sheets 64 returning to their original flat configuration after the pedestal passes.

The subject invention has been described in terms of two preferred embodiments; however, it should be understood that the invention is in no way limited to these embodiments. Many modifications will become obvious to one skilled in the art upon a reading and understanding of the foregoing description and drawings. For example, while the track cover has been shown in use with a trolley that supports a carrier on a pedestal above the trolley, it could also be used in an overhead conveyor system where the carrier hangs beneath the trolley from a support. In addition, while it is preferred to use two identical cover halves which are separated by the passage of a pedestal, one of the cover halves could be fixed while only the other cover half moves as a pedestal passes. All of these modifications are included within the scope of this invention to the extent that they are covered by the claims appended hereto.

I claim:

1. In a conveyor system comprising a conveyor track, a movable member, a drive for moving said movable member along said track in a first direction, a carrier for supporting an object, and a coupling member for coupling said carrier to said movable member, the improvement comprising:

a cover disposed between said movable member and said carrier for protecting said movable member, said cover comprising:
   first and second parallel supports spaced apart from and extending in the direction of said track;
   first and second resilient members connected to said first and second supports respectively and extending toward one another across said track; and,
   first and second edge strips connected to said first and second resilient members, respectively, being unattached to the first and second parallel supports, and held against each other in sealing engagement by said resilient members,
   whereby said coupling member forces apart a given length of said first and second edge strips as said movable member traverses said track and said resilient members return said given length of edge strips to a condition of sealing engagement after said coupling member passes.

2. The conveyor system of claim 1 wherein said first and second resilient members each comprise a resilient sheet of material.

3. The conveyor system of claim 1, wherein the first and second edges strips are flexible.

4. The conveyor system of claim 1, wherein the first and second edge strips are less resilient than the first and second resilient members.

5. The conveyor system of claim 1, wherein the first and second resilient members are made of a rubber material and the first and second edge strips are made of a flexible plastic material.

6. The conveyor of claim 1 wherein the first and second resilient members are sized so their respective distal edges are spaced from the coupling member as it travels between the first and second edge strips.

7. In a conveyor system comprising a conveyor track, a movable member, a drive for moving said movable member along said track in a first direction, a carrier for supporting an object, and a coupling member for coupling said carrier to said movable member, the improvement comprising:
   a cover disposed between said movable member and said carrier for protecting said movable member, said cover comprising:
      first and second parallel supports spaced apart from and extending in the direction of said track;
      first and second resilient members connected to said first and second supports respectively and extending toward one another across said track;
      first and second edge strips connected to said first and second resilient members, respectively, and held against each other in sealing engagement by said resilient members, and
      first and second support strips connected to said first and second supports and extending over said track, wherein said edge strips are held in sliding engagement with said support strips by said resilient sheets,
      whereby said coupling member forces apart a given length of said first and second edge strips as said movable member traverses said track and said resilient members return said given length of edge strips to a condition of sealing engagement after said coupling member passes.

8. The conveyor system of claim 7 including clamps for securing said resilient sheets to said supports.

9. The conveyor system of claim 8 wherein said resilient sheets partially overlay said edge strips.

10. The conveyor system of claim 9 wherein each of said resilient sheets includes a central portion overlaying said support strips between said clamps and said edge strips.

11. The conveyor system of claim 10 wherein said resilient sheets comprise soft rubber.

12. The conveyor system of claim 10 wherein said edge strips comprise high impact plastic.

13. The conveyor system of claim 10 wherein said parallel supports are sealingly connected to said conveyor tracks.

14. A seal for sealing a channel having a first edge and a second edge while allowing an object partially disposed in said channel to traverse said channel comprising:
   a first member having an inner portion and an outer portion;
   a first connector for connecting said first member outer portion to said first edge;
   a second member having an inner portion and an outer portion; and,
   a second connector for connecting said second member outer portion to said second edge and holding said second member inner portion in sealing engagement with said first member inner portion, each of said first and second members being unattached to the first and second edges;
   wherein said inner portion of said first member comprises a first material and said outer portion of said first connector comprises a second material, the second material being resilient to urge the inner portion of the first member in sealing engagement with the inner portion of the second member after separation of the inner portions of the first and second members.

15. The seal of claim 14 wherein said first material is flexible.

16. The seal of claim 14 wherein said inner portion of said second member comprises said first material and said outer portion of said second member comprises said second material.

17. The seal of claim 16 wherein said second material is resilient.

18. The seal of claim 17 wherein said first material is flexible.

19. The seal of claim 14 wherein said first member outer portion holds said first member inner portion against said second member inner portion.

20. The seal of claim 14 wherein said outer portion terminates in an end wall and wherein said inner portion is connected to said outer portion end wall.

21. The seal of claim 14, wherein the first material of the first member is less resilient than the second material of the first connector.

22. The seal of claim 21, wherein the second material is a rubber material and the first material is a flexible plastic material.

23. A seal for sealing a channel having a first edge and a second edge while allowing an object partially disposed in said channel to traverse said channel comprising:
   a first member having an inner portion and an outer portion;
   a first connector for connecting said first member outer portion to said first edge;
   a second member having an inner portion and an outer portion; and,
   a second connector for connecting said second member outer portion to said second edge and holding said second member inner portion in sealing engagement with said first member inner portion;

wherein said inner portion of said first member comprises a first material and said outer portion of said first member comprises a second material; and further wherein said first connector comprises a support connected proximate to said channel first edge, and a strip member connected to said support and extending over said channel toward said second edge for supporting said first member.

24. The seal of claim 23 wherein said support partially underlies said inner portion.

25. In a conveyor system comprising a conveyor track, a trolley, a drive for moving said trolley along said track in a first direction, a pedestal extending from said trolley away from said track, and a carrier connected to said pedestal, the improvement comprising:

a cover for protecting said trolley and track comprising:

first and second supports, each including a top wall, connected to said track and extending away from said track parallel to said pedestal;

first and second support strips connected to said first and second top walls and extending inwardly of said supports;

first and second sheets of resilient material connected to said first and second supports respectively and extending over said support strips and toward each other; and, first and second edge strips connected to said first and second resilient members, respectively, wherein said edge strips are supported by said top walls and held against each other in sealing engagement by said sheets, whereby said pedestal forces apart a given length of said first and second edge strips as said trolley travels between said top walls and said resilient sheets return said given length of edge strips to a condition of sealing engagement after said pedestal passes.

* * * * *